Nov. 5, 1963

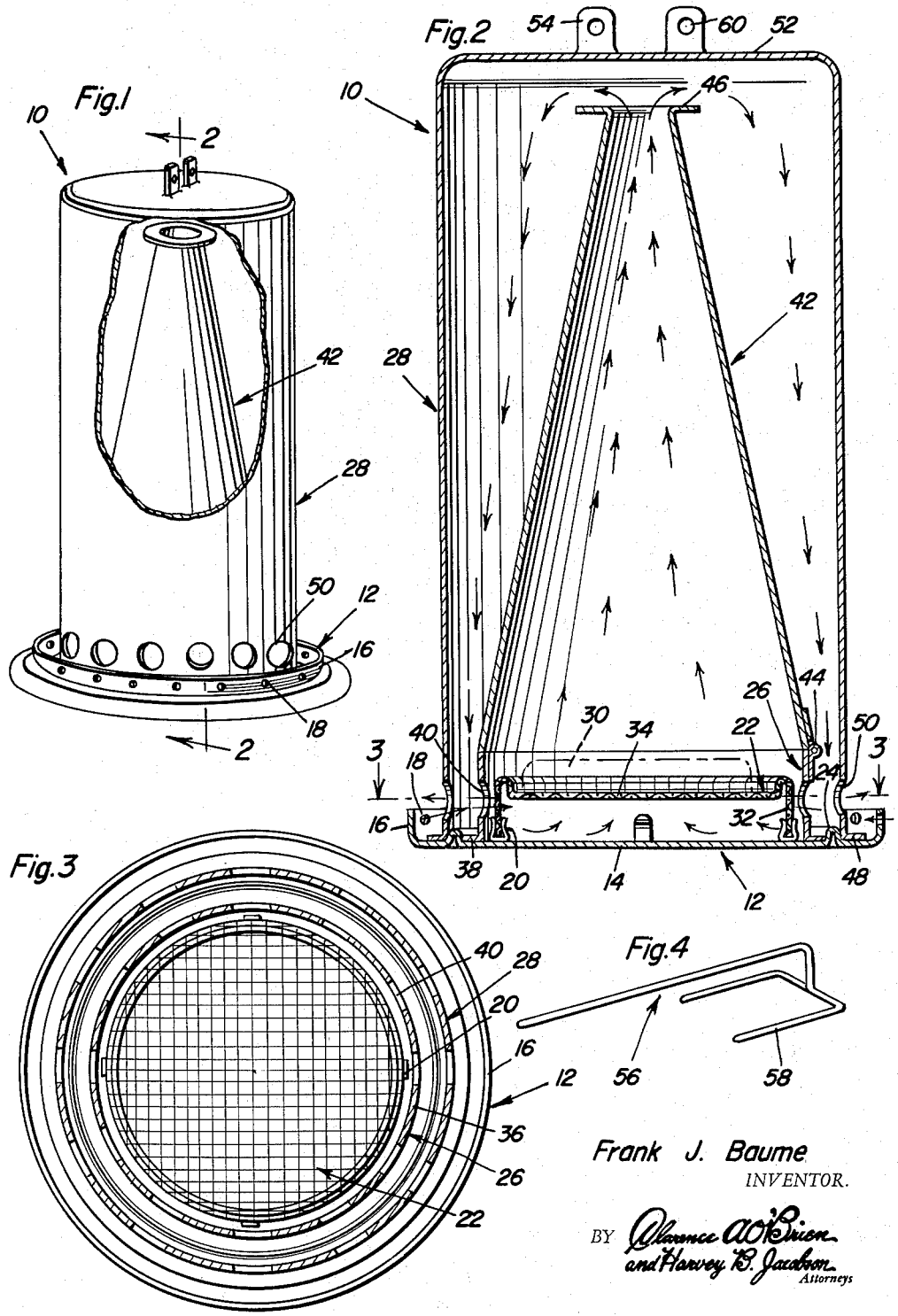

F. J. BAUME
COOKING DEVICE 3,109,360

Filed Nov. 22, 1960

Frank J. Baume
INVENTOR.

BY *Clarence A. O'Brien*
*and Harvey B. Jacobson*
Attorneys

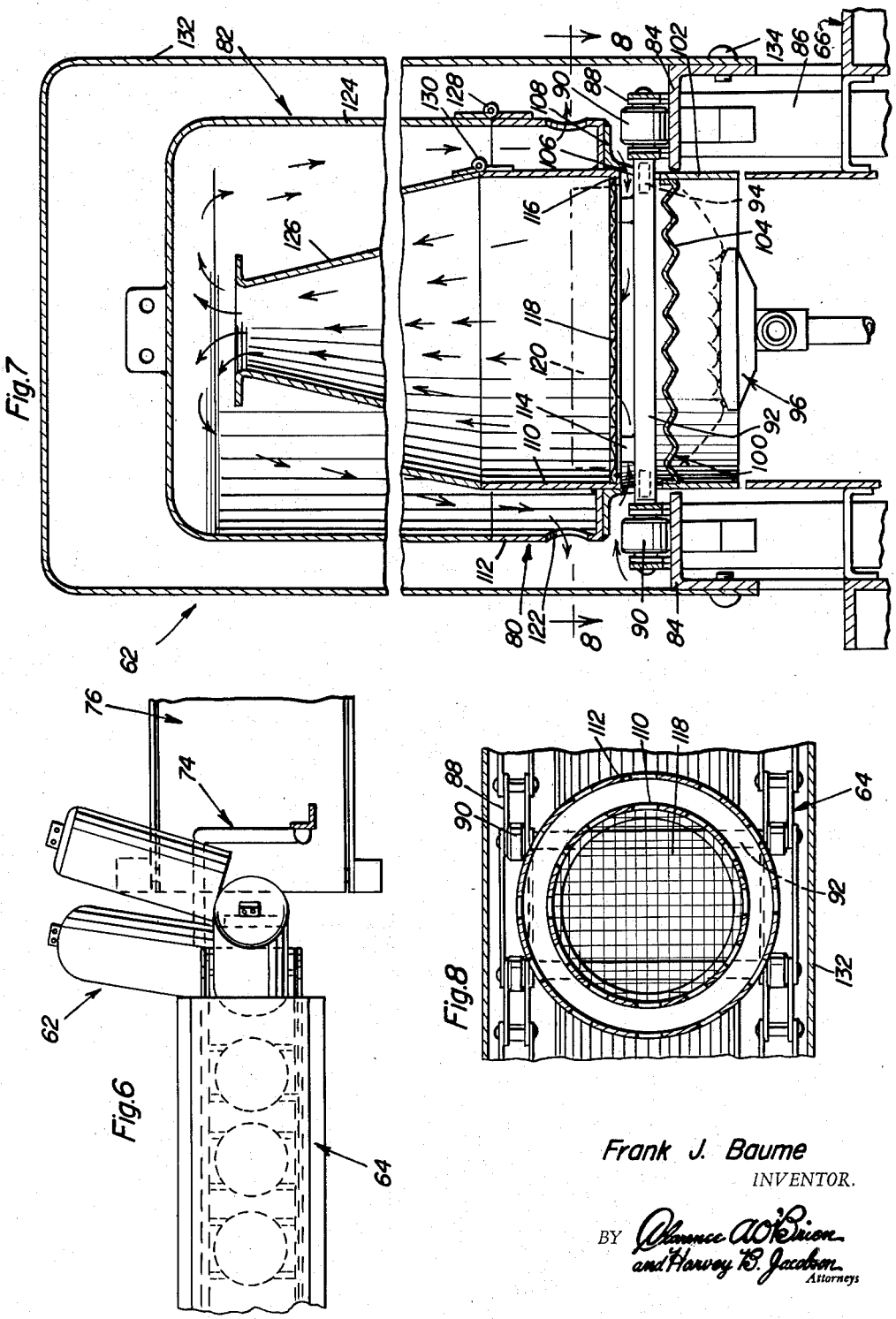

United States Patent Office 3,109,360
Patented Nov. 5, 1963

3,109,360
COOKING DEVICE
Frank J. Baume, P.O. Box 1656, San Francisco, Calif.
Filed Nov. 22, 1960, Ser. No. 70,970
21 Claims. (Cl. 99—386)

This invention relates to a novel cooking device especially useful for the preparation of steak and the like in an improved manner.

It is therefore a primary object of this invention to provide apparatus which will cook and prepare steaks, eggs or like foods in such a manner as to obtain a more tender, more uniformly cooked, tastier and digestively more compatible prepared foods than was heretofore possible with previous comparable apparatus.

Another object of this invention in accordance with the foregoing object, is to provide apparatus for cooking steak or the like in a more uniform manner by simultaneous texture separation of the food material so as to also produce a fluffy and therefore more tender and tastier prepared food such as steak.

A further object of this invention in accordance with the foregoing object, is to provide a cooking apparatus for steak or the like whereby a hot plate heats the adjacent air in contact therewith for cooking of the steak without contact therewith so as to prevent scorching and non-uniform heating of the food. The steak is accordingly supported above and in spaced relation to the hot plate by a wire mesh grill so that air may enter therebetween for heating by the hot plate and pass upwardly through and around the steak supported on the grill, the heating element whether it be gas flames or electric coils being separated from the grill supported steak by the hot plate and by a layer of air for more even and uniform heating thereof.

An additional object of this invention is to provide a cooking apparatus for steaks or the like which are supported on a grill in spaced relation above a hot plate which heats the air below the grill supported steak and suction inducing means such as a chimney stack or funnel is disposed above the grill so as to induce an upward draft causing air heated by the hot plate below the grill to pass upwardly through the steak for more uniform depth cooking and also by virtue of the suction created by the air flow to effect physical texture separation in order to render the steak more spongy and tender.

Another object of this invention is to provide a novel device as hereinbefore indicated which is mounted on an endless conveyor mechanism for movement relative to an elongated heating element so as to cook the steak to any desired degree by selective placement of the steak on the conveyor moving devices. The conveyor mechanism accordingly is arranged with respect to a fixed deflector element to cause pivotal opening of the cooking devices at one end of the conveyor mechanism permitting the cooked steak to fall therefrom onto a delivery conveyor. The basic concept of the novel cooking apparatus may thereby be applied in an efficient manner for mass production installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view with parts broken away illustrating one form of cooking apparatus made in accordance with this invention.

FIGURE 2 is a sectional view taken substantially through a plane indicated by section line 2—2 in FIGURE 1.

FIGURE 3 is a sectional view taken through a plane indicated by section line 3—3 in FIGURE 2.

FIGURE 4 is a perspective view of a hood lifting handle for the cooking apparatus.

FIGURE 6 is a partial top plan view of the apparatus illustrated in FIGURE 5.

FIGURE 7 is a broken sectional view taken substantially through a plane indicated by section line 7—7 of FIGURE 5.

FIGURE 8 is a partial sectional view taken substantially through a plane indicated by section line 8—8 in FIGURE 7.

Figure 5:
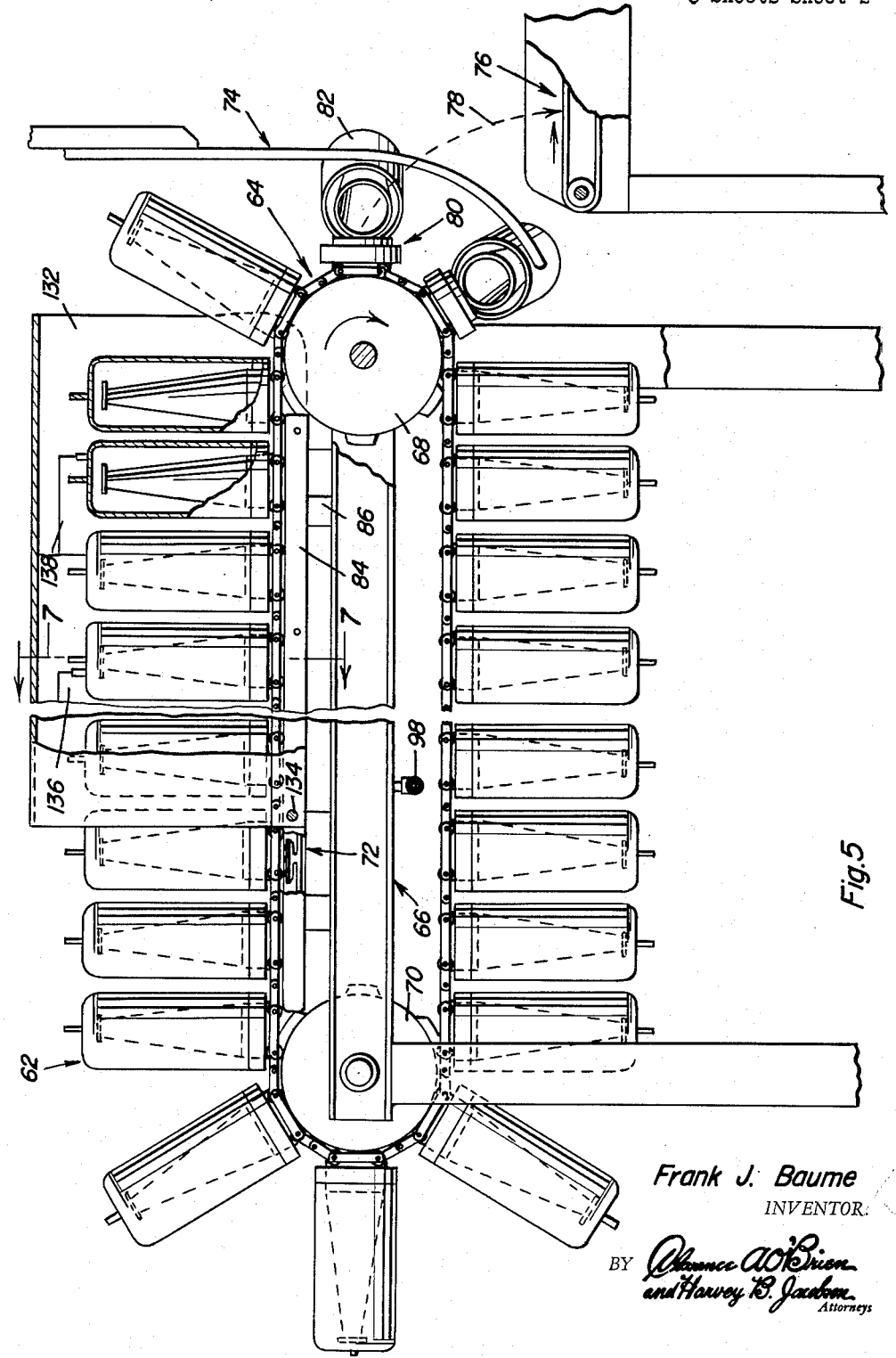
FIGURE 5 is a side elevational view with parts broken away and shown in section of a modified form of cooking apparatus made pursuant to this invention for mass production cooking purposes.

Referring now to the accompanying drawings, attention is first invited to FIGURES 1 through 4 which illustrate a first form of apparatus particularly useful as a single unit cooking device. It will therefore be observed that the cooking device as shown in FIGURES 1 and 2 is generally referred to by reference numeral 10.

The cooking device 10 is adapted to be placed above some source of heat whether it be an electric heating coil or a gas flame in order to apply heat to a saucer shaped hot plate element generally referred to by reference numeral 12. The hot plate element may be made of any suitable material whether it be metal or ceramic. In any event, the hot plate element 12 includes a bottom portion 14 having a centrally disposed heating surface above which various components of the apparatus are concentrically arranged for noncombustible heating of air. The hot plate element 12 also includes an upwardly extending rim portion 16 within which a plurality of air inlet openings 18 are disposed for purposes as will hereafter become apparent. It will also be noted that fastened to the top surface of the bottom portion 14 are a plurality of clip elements 20 for the purpose of removably receiving therein a food supporting perforate member or grill generally referred to by reference numeral 22. Also disposed on the bottom portion 14 of the hot plate element 12 is an annular upstanding projection 24 for the purpose of concentrically positioning on its radially inner side a food enclosure member 26 while on its radially outer side the annular projection 24 concentrically positions an outer hood member 28.

Referring now to the grill member 22 it will be observed that the grill 22 is formed from wire mesh or screening material suitable for the purpose of supporting food to be prepared thereon such as shown by dotted line in FIGURE 2 and identified by reference numeral 30. The grill 22 includes an annular portion 32, the bottom portion of which is received within the clip elements 20 so as to concentrically position the grill 22 above the heating surface on the hot plate element 12. The grill 22 therefore includes a recessed circular food supporting portion 34 which is vertically spaced the proper distance above the heating surface on the hot plate element 12 in order to accomplish the purposes and objectives of this invention. The vertical spacing will be rather small so that relatively little heat will be lost when transmitted from the heating surface 14 on the hot plate through the air disposed between the grill and hot plate. The spacing will however be sufficient to permit air flow to enter between the grill 22 and the hot plate 12 as indicated by the arrows in FIGURE 2. Inasmuch as the air within the funnel member 42 is surrounded by the air within the outer hood 28 forming a heat transfer barrier, the air above the hot plate 12 will be at a higher elevated temperature throughout within the funnel as compared to outside the funnel so as to thermally induce the flow of air as illustrated in FIGURE 2 since the top of the hood is closed. This flow is enhanced by the funnel-shape of the member 42 and draws cooler air into the bottom of the device through openings 16, 50 and 40 as also illustrated in FIGURE 2. This flow of cooled air will enhance the circulatory flow as shown since it will reduce the temperature of the air in the lower portion of the hood 28 surrounding the member 26. It will also be understood that although the grill 22 is shown in cylindrical form centered above the hot plate 12, other shapes may be utilized for centering above the hot plate in order to accommodate the particular type of food being prepared by the apparatus of this invention.

The enclosure member 26 forms a cooking chamber which is positioned centrally with respect to the grill 22 by means of the annular projection 24 on the hot plate, although illustrated to be cylindrical in FIGURE 3 may also have any other suitable perimeter other than that of a circle for enclosing the grill 22. The enclosure member 26 accordingly includes a vertical annular wall 36 (FIGURE 3) with a bottom flange portion 38 resting up against the annular projection 24 so as to concentrically position the member 26 about the grill 22 and on top of the hot plate 12. It will be noted that a plurality of air inlet openings 40 are provided in the annular wall 36 of the member 26 so as to admit air therethrough into the space between the grill 22 and the heating portion 14 of the hot plate.

As hereinbefore indicated, one of the essential ingredients of the present invention is to induce suction above the grill 22 for the purpose of causing flow of the air heated below the grill upwardly into the path of the food 30 disposed on the grill seeking to increase the porosity thereof so as to not only uniformly cook the food 30 in depth but to also effect texture separation by virtue of the suction created by the upward flow of air. The suction inducing action is therefore created by the conical shaped chimney stack or funnel member 42 which is disposed above the enclosure member 26 and constitutes a top closure therefor. The funnel member 42 is therefore hingedly connected at one side to the enclosure member 26 by hinge 44. The bottom of the funnel member 42 is therefore open, with its lower annular rim resting on the top rim of the enclosure member 26. The upper narrow diameter end 46 of the funnel member is flanged to provide a narrow opening for the outward passage of heated air therefrom, as shown by the arrows in FIGURE 2. Accordingly, as will be appreciated by those skilled in the art, a draft flow of air is created by virtue of the presence of the funnel member 42 in response to the heating of the air within the enclosure member 26 by the hot plate element 12. The suction so created will therefore achieve the objective of the invention as hereinbefore indicated.

In order to more efficiently retain the heat produced within the apparatus 10 a hood member 28 is concentrically positioned about the enclosure member 26 and funnel member 42 on top of the hot plate element 12. The hood member 28 therefore includes a bottom flange portion 48 by means of which the hood member is concentrically positioned on the hot plate radially outwardly of the annular projection 24 thereon. Heated air flow exiting from the top portion 46 of the funnel member 42 will therefore be directed downwardly with respect to the funnel member and enclosure member so as to have the benefit of a warmer atmosphere thereabout for more efficient use of the heat produced below the cooking apparatus 10. Exhaust openings 50 are therefore provided at the bottom portion of the hood member 28 through which the air flow may be accommodated. Also provided on the top enclosing portion 52 of the hood member 28 are a pair of upstanding apertured projecting members 54 by means of which the hood removing handle member 56 may be utilized to remove the hood member from its position on the hot plate 12. The handle member 56 accordingly includes a pair of parallel prong elements 58 for reception within the apertures 60 in the projecting members 54 on the hood 28 so that the handle 56 may lift the hood 28 off from the hot plate 12, without touching the heated material of the hood member 28.

From the foregoing description of the cooking apparatus 10, the improved manner in which the food placed on the grill 22 thereof is cooked will be apparent. In order to cook the food 30 therefore, it will be necessary to open the enclosure member 26 to expose the top thereof by pivotal movement of the funnel member 42 about its hinge connection 44 so that the steak 30 for example may be placed on top of the grill 22. The funnel member 42 will then be lowered into the position illustrated in FIGURE 2 and the hood member 28 placed thereover to effect circulation flow of heated air. A heating element of any suitable type disposed below the hot plate member element 12 will thereby heat the bottom portion 14 so as to heat the air in contact therewith below the grill portion 34. A fresh supply of cooler air will accordingly enter through apertures 18 in the rim portion 16 of the hot plate to displace the less dense heated air passing through the openings 40 into the space below the grill and above the hot plate. The heated air will accordingly transmit the heat to the steak 30 and will also be drawn upwardly with the requisite suction by virtue of the presence of the funnel member 42 above the enclosure member 26.

Referring now to FIGURES 5 through 8, it will become apparent that the cooking apparatus as described with respect to FIGURES 1 through 4 may be applied to a mass production cooking system in a most convenient manner by virtue of the constructional arrangement of the cooking device. Referring therefore to FIGURE 5, it will be observed that a plurality of cooking devices, each generally referred to by reference numeral 62 is operatively connected to an endless conveyor mechanism generally referred to by reference numeral 64. A conveyor frame assembly 66 is accordingly provided so as to rotatably mount at opposite ends thereof conveyor belt engaging sprocket wheels 68 and 70 one of which is power driven at a slow speed so as to maintain the conveyor belt mechanism 64 moving from left to right for example, as seen in FIGURE 5. Mounted on the frame assembly 66 and disposed just below the upper run of the conveyor belt mechanism 64 between the end sprocket wheels 68 and 70 thereof, is an elongated heat generating mechanism 72. The cooking devices 62 which are connected in spaced relation to each other on the belt mechanism 64 are thereby moved along the heating assembly 72 by the upper run of the belt mechanism. The cooking devices 62 will accordingly be loaded with the food as they are moved over the heating assembly 72. While the cooking devices 62 are moving along the bottom run of the conveyor mechanism 64 they will be empty. Accordingly, at one end of the conveyor mechanism 64, for example the right end as illustrated in FIGURE 5 there is provided a deflector bar 74 extending downwardly and laterally in spaced relation to the delivery end of the conveyor 64 as seen in FIGURES 5 and 6 which engages the cooking devices 62 passing thereby causing them to open by pivoting movement of a portion thereof in a lateral direction with respect to conveyor belt movement so that the food disposed on the base portion of the cooking device 62 will fall out therefrom onto a delivery conveyor 76 as indicated by the dotted arrow 78 in FIGURE 5 by virtue of the forward component of movement imparted thereto by the conveyor belt as it approaches the delivery end. It will be noted from FIGURE 7, that each cooking device 62 is composed of a base portion 80 and a top portion 82 with respect to which base portion the top portion 82 may be pivotally separated. It will therefore be observed that the pivotal connection between the base portion 80 and 82 is such that the pivotal axis is disposed parallel to the direction of movement of the belt mechanism so that there will be no gravity influenced pivotal separation between the top portion 82 and base portion 80 when the devices 62 are moved in a vertical direction between the upper and lower runs at the ends of the conveyor mechanism 64. Only lateral pivoting separation will be effected when the devices 62 are engaged by the deflector mechanism 74 appropriately fixed relative to the conveyor belt mechanism frame assembly 66.

It will therefore be appreciated that the conveyor belt mechanism 64 may have connected thereto cooking devices such as disclosed with respect to FIGURES 1 and 4, in which case it will only be necessary to connect the hot plate element 12 of the device 10 to the link of the conveyor belt mechanism 64. In such case however, the hood member 28 cannot be used since only the funnel member 42 thereof may be pivotally displaced for opening of the closure member 26 to permit the food 30 thereon to be dropped off onto the delivery conveyor 76. FIGURES 7 and 8 however more specifically illustrate the cooking device 62 which represents a modification of the device 10 making it especially adaptable for the mass production cooking system illustrated in FIGURES 5 and 6. It will therefore be noted in FIGURE 7 that the frame assembly 66 for the conveyor mechanism includes a pair of track members 84 supported from the frame assembly by a plurality of connecting post members 86. The conveyor belt mechanism 64 which is comprised of pivotally interconnected links 88, is supported on the track element 84 at the upper run portion by having a plurality of roller members 90 rotatably mounted on link interconnecting pivot pins 94 which are spaced from each other on opposite sides of the conveyor mechanism by means of a plurality of spacer elements 92. As more clearly seen in FIGURE 8, a pair of spacer elements 92 support thereabove the cooking devices 62. Also, disposed below the cooking devices between the track members 84 are the burner units 96 of the heating assembly 72. The burner units 96 are therefore interconnected by conduit for supply thereto of gas through inlet 98 as seen in FIGURE 5. Although gas burner units are illustrated as constituting the heating assembly 72, it will be understood that any other suitable type of heating unit may be utilized such as electric heating units.

From FIGURE 7, it will be noted that the base portion 80 of the cooking device 62 includes a hot plate unit 100 which is formed by an annular wall portion 102 depending below the track members 84 to which a corrugated heating surface element 104 is connected above the burner unit 96. Accordingly, the surface 104 receives the heat from the burner unit over a larger surface for heating the air disposed thereabove. Disposed in the annular wall 102 of each of the hot plate units 100 are slots 106 through which the spacer element 92 extends. The slots 106 also constitute air inlet openings for admitting air into the space above the heating surface 104. The hot plate unit 100 also includes annular flange portion 108 to which the enclosure member 110 and the base portion 112 of the hood member are connected as by welding. Connecting elements 114 may also be provided between a bottom rim 116 on the enclosure member and the spacer elements 92 for supporting the enclosure member in spaced relation above the heated surface element 104. Mounted on top of the bottom rim 116 of the enclosure member 110, is the grill element 118 upon which the food 120 indicated by dotted line in FIGURE 7 may be supported for cooking purposes. Also, a plurality of exhaust openings 122 are provided on the base portion 112 of the hood member corresponding to the exhaust openings 50 of the cooking device 10.

The upper portion 82 of the cooking devices 62 are composed of both the upper portion 124 of the hood and the funnel member 126 which corresponds both in structure and function to the funnel member 42 of cooking device 10 hereinbefore described. It will therefore be noted that hinges 128 and 130 are respectively provided for interconnecting the upper portion of the hood 124 to the base portion 112 and the funnel member 126 to the enclosure member 110. The cooking action as described with respect to device 10 will therefore be equally applicable to the device 62. The differences between the devices 10 and 62 reside however in the rigid connection of a modified hot plate unit to the conveyor belt mechanism and the rigid connection thereto of the enclosure member together with the grill member 118. The hood construction is also modified so as to permit pivotal separation between a base portion and an upper portion together with pivotal separation between the funnel member 126 and the enclosure member 110 when the upper portion 82 of the device 62 engages the deflector mechanism 74. The hinge axes for the hinges 128 and 130 will therefore be disposed parallel to the direction of movement of the conveyor belt mechanism as hereinbefore indicated.

It will be observed that a major portion of the upper run of the conveyor mechanism is enclosed within an enclosing housing 132 which is bolted by fasteners 134 to the track members 84. The cooking device 62 will therefore pass through the housing 132 prior to engagement by the deflector mechanism 74. It will be observed from FIGURE 5, that a plurality of doors 136 and 138 may be provided at one side of the housing 132 so as to define a plurality of stations through which a cooking device 62 may be opened for insertion of the food on the base portion thereof. Depending on the station selected, to insert the steak for example, the desired degree of cooking of the steak may be obtained with uniformity. For example, the door 138 being closest to the exit end of the conveyor mechanism will produce a predetermined rarely cooked steak. Insertion of the steak into the device 62 furthest from the delivery end of the conveyor mechanism will of course produce a well done steak. It will of course be appreciated by those skilled in the art, that the system as disclosed in FIGURES 5 through 8 will by proper designing of the length and speed of the conveyor belt mechanism and the spacing between the food supporting grill 118 and heating surface element 104 achieve cooking pursuant to the principles of the invention as described with respect to FIGURES 1 through 4 in a continuous rapid and efficient manner for mass production installation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cooking device for steaks, eggs or the like food, comprising, hot plate means operative when in a heated condition to heat air in contact therewith, enclosure means resting on the hot plate means to confine thereabove a volume of air to be heated, horizontal perforate grill means mounted within the enclosure means in spaced relation above the hot plate means, air inlet means disposed in the hot plate means and the enclosure means for admitting a fresh supply of air between the hot plate means and grill means suction inducing means operatively mounted on the enclosure means for producing a circulating flow of air heated by the hot plate means below the grill means moving upwardly only through the grill means at an increased flow rate for texture separation and uniform cooking of food adapted to be supported on the grill means in response to heating of the hot plate means and heating means disposed below the hot plate means for heating thereof.

2. The combination of claim 1, wherein said suction inducing means comprises upwardly tapering funnel means operatively connected to the enclosure means for conducting an upward draft of heated air in response to heating of air within the enclosure means by the hot plate means, said funnel means forming an unobstructed passage with the enclosure means communicating with said grill means to increase the flow rate of said upward draft of heated air through the grill means.

3. A cooking device for steaks, eggs or the like food, comprising, hot plate means operative when in a heated condition to heat air in contact therewith, enclosure means resting on the hot plate means, horizontal perforate grill means mounted within the enclosure means in spaced relation above the hot plate means, air inlet means disposed in the hot plate means and the enclosure means for admitting a fresh supply of air between the hot plate means and grill means, suction inducing means operatively mounted on the enclosure means for producing a circulating flow of air heated by the hot plate means below the grill means moving upwardly only through the grill means for texture separation and uniform cooking of food adapted to be supported on the grill means in response to heating of the hot plate means, heating means disposed below the hot plate means for heating thereof, said suction inducing means comprising upwardly tapering funnel means operatively connected to the enclosure means for inducing an upward draft in response to heating of air within the enclosure means by the hot plate means and separable from the enclosure means for insertion and removal of food adapted to be placed on the grill means, and hood means mounted over the suction inducing means and the enclosure means for conducting heated air from the suction inducing means downwardly to an exhaust at a bottom of the enclosure means.

4. The combination of claim 3, wherein said funnel means is hingedly connected to one side of the enclosure means to pivotally separate the funnel means and the enclosure means for insertion and removal of food adapted to be placed on the grill means.

5. The combination of claim 4 wherein said hot plate means comprises a bottom portion having a heating surface centrally disposed below the grill means and a rim portion extending upwardly about the enclosure means, said air inlet means including air inlet openings formed in said rim portion through which said fresh supply of air flows.

6. The combination of claim 5 including positioning means mounted on the bottom portion of the hot plate means for receiving the grill means, the enclosure means and the hood means in concentric relation to each other above the hot plate means.

7. The combination of claim 1, including hood means having an imperforate top mounted over the suction inducing means and the enclosure means for conducting heated air from the suction inducing means downwardly to an exhaust at a bottom of the enclosure means.

8. The combination of claim 7 wherein said hot plate means comprises a bottom portion having an imperforate heating surface centrally disposed below the grill means and a rim portion extending upwardly about the enclosure means, said air inlet means including air inlet openings formed in said rim portion.

9. The combination of claim 8 including positioning means mounted on the bottom portion of the hot plate means for receiving the grill means, the enclosure means and the hood means in concentric relation to each other above the hot plate means.

10. The combination of claim 1, wherein said hot plate means comprises a bottom portion having an imperforate heating surface centrally disposed below the grill means and a rim portion extending upwardly about the enclosure means, said air inlet means including air inlet openings formed in said rim portion.

11. The combination of claim 10, wherein said heating surface is corrugated.

12. A cooking device for steaks, eggs or the like food, comprising, hot plate means operative when in a heated condition to heat air in contact therewith, enclosure means resting on the hot plate means, horizontal perforate grill means mounted within the enclosure means in spaced relation above the hot plate means, air inlet means disposed in the hot plate means and the enclosure means for admitting a fresh supply of air between the hot plate means and the grill means, suction inducing means operatively mounted on the enclosure means for producing a circulating flow of air heated by the hot plate means below the grill means moving upwardly through the grill means for texture separation and uniform cooking of food adapted to be supported on the grill means in response to heating of the hot plate means, heating means disposed below the hot plate means for heating thereof, said hot plate means comprising a bottom portion having a heating surface centrally disposed below the grill means and a rim portion extending upwardly about the enclosure means, said air inlet means including air inlet openings formed in said rim portion, said heating surface being corrugated, and said enclosure means being mounted on an endless conveyor means for horizontal movement relative to said heating means.

13. The combination of claim 12, wherein said suction inducing means comprises upwardly tapering funnel means connected to the enclosure means for inducing an upward draft in response to heating of air within the enclosure means by the hot plate means.

14. A cooking device for steaks, eggs or the like food, comprising, hot plate means operative when in a heated condition to heat air in contact therewith, enclosure means resting on the hot plate means, grill means mounted within the enclosure means in spaced relation above the hot plate means, air inlet means disposed in the hot plate means and grill means and suction inducing means operatively mounted on the enclosure means for producing flow of air heated by the hot plate means below the grill means upwardly through the grill means for texture separation and uniform cooking of food adapted to be supported on the grill means in response to heating of the hot plate means, said hot plate means comprising a bottom portion having a heating surface centrally disposed below the grill means and a rim portion extending upwardly about the enclosure means and air inlet openings in said rim portion, said heating surface being corrugated, said enclosure means being mounted on an endless conveyor means for horizontal movement relative to longitudinally extending heating means, said suction inducing means comprising upwardly tapering funnel means connected to the enclosure means for inducing an upward draft in response to heating of air within the enclosure means by the hot plate means, said suction inducing means being hingedly connected to the enclosure means along an axis parallel to movement of the enclosure means when moved by the conveyor means over the heating means so as to prevent opening of the enclosure means in response to vertical movement thereof between upper and lower runs of the conveyor means at opposite ends of the conveyor means.

15. The combination of claim 14 including deflector means engageable with the suction inducing means at one end of the conveyor means to laterally displace the funnel means for pivotal opening movement about the hinge axis in response to downward vertical movement of the enclosure means at said one end of the conveyor means permitting cooked food on the grill means to fall onto a delivery means.

16. A cooking device for steaks, eggs or the like food, comprising, hot plate means operative when in a heated condition to heat air in contact therewith, enclosure means resting on the hot plate means, horizontal perforate grill means mounted within the enclosure means in spaced relation above the hot plate means, air inlet means disposed in the hot plate means and the enclosure means for admitting a fresh supply of air between the hot plate means and the grill means, suction inducing means operatively mounted on the enclosure means for producing a circulating flow of air heated by the hot plate means below the grill means moving upwardly through the grill means for texture separation and uniform cooking of food adapted to be supported on the grill means in response to heating of the hot plate means, and heating means disposed below the hot plate means for heating thereof, said enclosure means being mounted on an endless conveyor means for horizontal movement relative to said heating means.

17. A cooking device for steaks, eggs or the like food, comprising, hot plate means operative when in a heated condition to heat air in contact therewith, enclosure means resting on the hot plate means, grill means mounted within the enclosure means in spaced relation above the hot plate means, air inlet means disposed in the hot plate means and enclosure means for admitting air between the hot plate means and grill means and suction inducing means operatively mounted on the enclosure means for producing flow of air heated by the hot plate means below the grill means upwardly through the grill means for texture separation and uniform cooking of food adapted to be supported on the grill means in response to heating of the hot plate means, said enclosure means being mounted on an endless conveyor means for horizontal movement relative to longitudinally extending heating means, said suction inducing means being hingedly connected to the enclosure means along an axis parallel to movement of the enclosure means when moved by the conveyor means over the heating means so as to prevent opening of the enclosure means in response to vertical movement thereof between upper and lower runs of the conveyor means at opposite ends of the conveyor means.

18. The combination of claim 17 including deflector means engageable with the suction inducing means at one end of the conveyor means to laterally displace the funnel means for pivotal opening movement about the hinge axis in response to downward vertical movement of the enclosure means at said one end of the conveyor means permitting cooked food on the grill means to fall onto a delivery means.

19. A cooking device comprising, imperforate heating surface means operative to heat air in contact therewith, chamber means mounted on said heating surface means to confine a volume of air in contact therewith for non-combustible heating of said air inducing an upward thermal flow of heated air, perforate food supporting means enclosed within the chamber means in spaced relation to the heating surface means through which said thermally induced airflow passes, air flow inducing means enclosing said chamber means for restricting said thermally induced upward flow of heated air through the perforate food supporting means and increasing the flow rate thereof and air inlet means operatively mounted in the chamber means below the perforate food supporting means and above the heating surface means to permit entry of air only, to the chamber means.

20. The combination of claim 19, including conveyor means having upper and lower runs supporting said heating surface means for movement and fixedly mounted heating means extending parallel to said conveyor means between the upper and lower runs thereof.

21. The combination of claim 20, wherein said flow inducing means is hingedly connected to the chamber means along an axis parallel to movement of the chamber means when moved by the conveyor means over the heating means so as to prevent opening of the chamber means in response to vertical movement thereof between said upper and lower runs of the conveyor means.

References Cited in the file of this patent

UNITED STATES PATENTS

| | | |
|---|---|---|
| 384,683 | Dinsmore | June 19, 1888 |
| 396,576 | Ketchum | Jan. 22, 1889 |
| 1,214,547 | Jeavons | Feb. 6, 1917 |
| 1,599,412 | Goldstone | Sept. 14, 1926 |
| 1,777,493 | Jadin | Oct. 7, 1930 |
| 2,037,400 | Tschierschwitz | Apr. 14, 1936 |
| 2,930,310 | Poppenburg | Mar. 29, 1960 |